US006986819B2

(12) United States Patent
Tillotson et al.

(10) Patent No.: US 6,986,819 B2
(45) Date of Patent: Jan. 17, 2006

(54) METAL-OXIDE-BASED ENERGETIC MATERIALS AND SYNTHESIS THEREOF

(75) Inventors: Thomas M. Tillotson, Tracy, CA (US); Randall L. Simpson, Livermore, CA (US); Lawrence W. Hrubesh, Pleasanton, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/422,488

(22) Filed: Apr. 24, 2003

(65) Prior Publication Data

US 2004/0060626 A1    Apr. 1, 2004

Related U.S. Application Data

(63) Continuation of application No. 09/587,234, filed on Jun. 2, 2000, now abandoned.

(51) Int. Cl.
*D03D 23/00*     (2006.01)
(52) U.S. Cl. ....................... 149/109.6; 149/37
(58) Field of Classification Search ............. 149/37, 149/5, 109.6
See application file for complete search history.

(56) References Cited

U.S. PATENT DOCUMENTS

| | | | | |
|---|---|---|---|---|
| 3,480,488 A | * | 11/1969 | Rudy et al. ............... | 149/5 |
| 3,706,608 A | * | 12/1972 | Geisler ..................... | 149/6 |
| 4,017,342 A | * | 4/1977 | Geisler et al. ........... | 149/5 |
| 4,019,934 A | * | 4/1977 | Takayama et al. ....... | 149/43 |
| 4,880,483 A | * | 11/1989 | Baldi ....................... | 149/5 |
| 4,989,515 A | * | 2/1991 | Kelly et al. ............ | 102/202.9 |
| 5,030,301 A | * | 7/1991 | Stout et al. ............. | 149/5 |
| 5,049,212 A | * | 9/1991 | Colick ...................... | 149/5 |
| 5,717,159 A | * | 2/1998 | Dixon et al. ............ | 149/37 |
| 5,855,827 A | * | 1/1999 | Bussing et al. ......... | 264/7 |
| 5,885,321 A | * | 3/1999 | Higa et al. ............. | 75/362 |
| 6,270,836 B1 | * | 8/2001 | Holman ................... | 149/14 |
| 6,296,678 B1 | * | 10/2001 | Merzbacher et al. .... | 149/109.6 |
| 6,454,886 B1 | * | 9/2002 | Martin et al. ........... | 149/109.6 |
| 2002/0104599 A1 | * | 8/2002 | Tillotson et al. ........ | 149/19.92 |

* cited by examiner

*Primary Examiner*—Aileen Felton
(74) *Attorney, Agent, or Firm*—John P. Wooldridge; Ann M. Lee; Alan H. Thompson (57) ABSTRACT

A method of preparing energetic metal-oxide-based energetic materials using sol-gel chemistry has been invented. The wet chemical sol-gel processing provides an improvement in both safety and performance. Essentially, a metal-oxide oxidizer skeletal structure is prepared from hydrolyzable metals (metal salts or metal alkoxides) with fuel added to the sol prior to gelation or synthesized within the porosity metal-oxide gel matrix. With metal salt precursors a proton scavenger is used to destabilize the sol and induce gelation. With metal alkoxide precursors standard well-known sol-gel hydrolysis and condensation reactions are used. Drying is done by standard sol-gel practices, either by a slow evaporation of the liquid residing within the pores to produce a high density solid nanocomposite, or by supercritical extraction to produce a lower density, high porous nanocomposite. Other ingredients may be added to this basic nanostructure to change physical and chemical properties, which include organic constituents for binders or gas generators during reactions, burn rate modifiers, or spectral emitters.

8 Claims, 4 Drawing Sheets

METAL-OXIDE-BASED ENERGETIC MATERIALS AND SYNTHESIS THEREOF

RELATED APPLICATION

This application is a Continuation of application Ser. No. 09/587,234 filed Jun. 2, 2000 now abandoned, and claims priority thereto.

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to energetic materials, particularly to nanostructured energetic materials produced by sol-gel chemistry, and more particularly to a method which involves producing a metal-oxide skeletal structure from hydrolyzable salts, and utilizing this skeletal structure to produce metal-oxide-based energetic materials using sol-gel processing. The nanostructured metal-oxide serves as a reactant, specifically an oxidizer, in the energetic material. During gelation the metal-oxide medium also serves as a processing aid in which other energetic material ingredients may be suspended. The metal-oxide also provides mechanical strength to the final energetic material. The invention of making metal-oxide-based energetic materials using sol-gel chemistry is applicable to oxides formed from the following elements of the periodic table: Groups 2 through 13, part of Group 14 (germanium, tin, lead), part of Group 15 (antimony, bismuth), part of Group 16 (polonium), and the lanthanides and actinides.

Metal-oxide-based energetic materials are generally prepared by the mixing of fine powders. An example of which would be pyrotechnics such as thermite, which produce high temperature.

Energetic materials are herein defined as any material which stores chemical energy in a fixed volume. Explosives, propellants, and pyrotechnics are examples of energetic materials. Reaction is initiation by mechanical or thermal stimulus. Explosives and propellants may be thought of as a means of storing gas. Pyrotechnics typically release much of their energy as heat.

Energetic materials consist of fuels and oxidizers which are intimately mixed. This is done by incorporating fuels and oxidizers within one molecule or through chemical and physical mixtures of separate fuel and oxidizer ingredients. The material may also contain other constituents such as binders, plasticizers, stabilizers, pigments, etc.

Traditional manufacturing of energetic materials involves processing granular solids into parts. Materials may be pressed or cast to shape. Performance properties are strongly dependent on particle size distribution, surface area of the constituents, and void volume. In many cases achieving fast energy release rates, as well as insensitivity to unintended initiation, necessitates the use of small particles ($\leq 100$ $\mu$m) which are intimately mixed. Reproducibility in performance is adversely affected by the difficulties of synthesizing and processing materials with the same particle morphology and distribution uniformity. Manufacturing these granular substances into complex shapes is often difficult due to limitations in processing highly solid filled materials.

An example of an existing limitation of processing granular solids is in manufacturing energetic materials for detonators. The state-of-the-art now requires the precise synthesis and recrystallization of explosive powders. These powders typically have high surface areas (e.g., >1 $m^2/g$). The powders are weighed and compacted at high pressures to make pellets. Handling fine grain powders is very difficult.

Dimensional and mechanical tolerances may be very poor as the pellets may contain little or no binder. Changes in the density and dimensions of the pellets affect both initiation and detonation properties. Manufacturing rates are also low as the process is usually done one at a time. Certification of material is typically done by expensive, end-use detonation performance testing and not solely by chemical and physical characterization of the explosive powder. As these detonators or initiating explosives are sensitive, machining to shape pressed pellets is typically not done.

Another current limitation is producing precise intimate mixtures of fuels and oxidizers. The energy release rates of energetic materials are determined by the overall chemical reaction rate. Monomolecular energetic materials have the highest power as the energy release rates are primarily determined by intramolecular reactions. However, energy densities can be significantly higher in composite energetic materials. Reaction rates (power) in these systems are typically controlled by mass transport rates of reactants.

In general, initiation and detonation properties of energetic materials are dramatically affected by their microstructural properties. It is generally known in material science that the mechanical, acoustic, electronic, and optical properties are significantly and favorably altered in materials called "nanostructures," which are made from nanometer-scale building blocks. Modern technology, through sol-gel chemistry, provides an approach to control structures at the nanometer scale, thus enabling the formation of new energetic materials, generally having improved, exceptional, or entirely new properties.

Since the invention of black powder the technology for making solid energetic materials has remained either the physical mixing of solid oxidizers and fuels, referred to as composite energetic materials (e.g., black powder); or the incorporation of oxidizing and fuel moieties into one molecule, referred to as monomolecular energetic materials (e.g., trinitrotoluene, TNT).

The basic distinctions between these prior known energetic composites and energetic materials made from monomolecular approaches are as follows. In composite systems, desired energy properties can be attained through readily varied ratios of oxidizer and fuels. A complete balance between the oxidizer and fuel may be reached to maximize energy density. Current composite energetic materials can store energy as densely as >23 $kJ/cm^3$. However, due to the granular nature of composite energetic materials, reaction kinetics are typically controlled by the mass transport rates between reactants. Hence, although composites may have extreme energy densities, the release rate of that energy is below that which may be attained in a chemical kinetics controlled process.

In monomolecular energetic materials the rate of energy release is primarily controlled by chemical kinetics, not by mass transport. Therefore, monomulecular materials can have much greater power than composite energetic materials. A major limitation with these monomolecular energetic materials is the total energy density achievable. Currently, the highest energy density for monomolecular materials is approximately 12 $kJ/cm^3$, about half that achievable in composite systems. The reason for this is that the requirement for a chemically stable material and the current state of the art synthetic procedures limit both the oxidizer-fuel balance and the physical density of the material.

A new synthesis approach to forming energetic materials, specifically pyrotechnics, explosives, and propellants, using the chemical sol-gel methodology is described and claimed in U.S. application Ser. No. 08/926,357 filed Sep. 9, 1997, entitled "Sol-Gel Manufactured Energetic Materials" and in International Application No. PCT/US98/18262 (WO 99/12870) published Mar. 18, 1999. In energetic composites we can control oxidizer-fuel balances at the nanometer scale. Sol-gel chemistry involves the reactions of chemicals in solution to produce nanometer-sized primary particles, called "sols." The "sols" can be linked to form a three-dimensional solid network, called a "gel," with the remaining solution residing within open pores. Solution chemistry determines the resulting nanostructure and composition, which in turn determine the material properties. Controlled evaporation of the liquid phase results in a dense porous solid, "xerogel." Supercritical extraction (SCE) eliminates the surface tension and in so doing the capillary forces of the retreating liquid phase that collapse the pores. The results of SCE are highly porous, lightweight solids called "aerogels." A typical gel structure is characteristically very uniform because the particles and the pores between them are on the nanometer size scale. Such homogeneity ensures uniformity of the material properties, which is one of the key reasons for synthesizing energetic materials using the sol-gel methodology.

A main interest in the sol-gel approach to energetic materials is that it offers the possibility to precisely control the composition and morphology of the solid at the nanometer scale, a result that is difficult or not possible to achieve by conventional techniques. We believe that such control of the nanostructure could enable the creation of entirely new energetic materials with desirable properties. One important result from this work that supports the aforementioned thesis is a decrease in the impact sensitivity of sol-gel derived energetic nanocomposite materials. For example, we have shown that energetic ingredients processed by conventional methods exhibited drop-hammer impact sensitivities <10 cm, whereas the same constituents processed with sol-gel chemistry showed >130 cm sensitivity. This finding with its implications to the safety of energetic materials may be important in and of itself, albeit much more characterization work is required.

In addition to providing fine nanostructural and compositional control, sol-gel methodology offers other advantages to safety in energetic material processing. For example, ambient temperature gelation and low temperature drying schemes prevent degradation of the energetic molecules, and the water-like viscosity of the sol before gelation, allows easy casting to near-net shapes, which may be preferred to the alternatives.

Although sol-gel chemistry is a well-known means of producing nanostructured materials, the above-referenced patent application resulted from the first use thereof to create energetic materials using sol-gel processing. In development of the energetic materials by sol-gel processing, four new classes of energetic materials have been derived, and which comprise: 1) an energetic nanocomposite, 2) nanocrystalline materials, 3) powder addition energetic materials, and 4) energetic skeletal materials, and these four classes of sol-gel produced energetic materials are described hereinafter and illustrated.

Nanocomposites are multicomponent materials in which at least one of the component phases has one or more dimensions (length, width, or thickness) in the nanometer size range, usually defined as 1 to 100 nm. Energetic nanocomposites are a class of materials that have a fuel component and an oxidizer component intimately mixed on the nanometer scale with at least one of the component phases which meets the size definition. An example would be an organic skeletal matrix acting as a fuel, with an oxidizer embedded within this network.

Using a sol-gel procedure first described by R. W. Pekala, J. Mater. Sci. 24, 3221 (1989), to make aerogels, a porous organic solid matrix containing —$CH_2$—, was prepared by the polycondensation of resorcinol with formaldehyde (RF). Subsequent crystallization of an oxidizer, ammonium perchlorate (AP), within the pores of the gel matrix, completes the synthesis. The oxidizer was first dissolved in water, then added to the reacting RF sol prior to gelation. Gelation of the RF sol occurred first, then crystallization of the AP was induced by exchanging the liquid residing in the pores for a solvent in which the oxidizer was insoluble. The final step of removing the pore fluid was done by either a slow evaporation resulting in a dense solid, or by supercritical extraction (SCE) with carbon dioxide, leading to a low density, highly porous material.

Transmission electron microscopy (TEM) of the nanocomposite showed a solid structure composed of interconnected clusters of nanometer size primary particles, and crystallites, generally smaller than 20 nm. Near-edge x-ray absorption microscopy of the same sample showed that nitrogen was uniformly distributed in the material on a scale less than 43 nm, which is the limit of resolution for that technique. These results for the nanostructure were consistent with other published reports on the structure of sol-gel derived materials.

Small-angle neutron scattering (SANS), a non-destructive method for characterizing nanostructures, was conducted at the National Institute of Standards Technology on both the energetic nanocomposites and the fuel-only samples. The result for the fuel-only (RF) specimens is consistent with other SANS data for gels, which typically give average primary particle sizes of a few nanometers. By comparison, the results for the RF-AP nanocomposite bulk material and thin films, show extremely small ($\approx$1 nm) particles (probably oxidizer crystals that have grown within the gel pores), as well as >10 nm particles that are presumed to be larger oxidizer crystals that have grown to occupy several gel pores. Sol-gel chemistry ultimately offers a means to control the distribution and size of crystals within the gel matrix.

Differential scanning calorimetry (DSC) is a method commonly used to establish the internal energy content of energetic materials by measuring exothermic energy releases as a function of temperature. DSC plots for a RF-AP nanocomposite and neat ammonium perchlorate were compared. The trace for the RF-AP nanocomposite showed an exotherm at about 260° C., indicating that it is indeed energetic, whereas the trace for the neat AP showed no exothermic reaction in the absence of the fuel skeleton (RF).

The present invention follows the above-described sol-gel processing approach and involves metal-oxide-based energetic. In the energetic material of the present invention, a sol-gel synthesized metal-oxide oxidizer reacts rapidly with a fuel distributed in the gel exchanging the oxygen and releasing significant amounts of energy. The invention involves methods to make metal-oxide-based energetic materials. When processed with fuels e.g., particulate metals, polymers, etc., nanostructured energetic materials are fabricated. The invention involves fabricating a metal-oxide skeletal structure prepared from hydrolyzable metal salts (i.e., metal salts or metal alkoxides), after which a fuel (e.g., metal or other inorganic or organic fuels) is added to the sol prior to gelation or grown within the solid matrix after drying.

SUMMARY OF THE INVENTION

It is an object of the present invention to produce energetic materials by sol-gel chemistry.

A further object of the invention is to provide metal-oxide-based energetic materials using sol-gel chemistry to make metal-oxides from the following elements of the periodic table: Groups 2 through 13, part of Group 14 (germanium, tin, lead), part of Group 15 (antimony, bismuth), part of Group 16 (polonium), and the lanthanides and actinides.

A further object of the invention is to provide an energetic material with significantly less impact sensitivity.

Another object of the invention is to provide a metal-oxide-based energetic material, such as $Fe_xO_y/Al$, derived from sol-gel chemistry.

Other objects and advantages of the present invention will become apparent from the following description and the accompanying drawings. The invention involves sol-gel manufactured metal-oxide-based energetic materials and a process utilizing sol-gel chemistry for producing the metal-oxide energetic materials. Energetic materials manufactured using sol-gel chemistry possess superior properties in terms of microstructural homogeneity, and/or can be more easily processed and/or processed with greater precision and accuracy, than can be obtained by the prior known technology. The sol-gel manufactured energetic materials can be utilized as precision detonator explosives, precision explosives, propellants, pyrotechnics, and high power energetic composites.

The sol-gel process is a synthetic chemical process where reactive monomers are mixed into a solution; polymerization occurs leading to a highly cross-linked three-dimensional solid network resulting in a gel. The composition, pore and primary particle sizes, gel time, surface areas, and density may be tailored and controlled by the solution chemistry. The gels are then subjected to either supercritical extraction or controlled slow evaporation of the liquid phase from the gel. Supercritical extraction of these gels allows the surface tension of the leaving liquid phase to be reduced to near zero and results in a highly porous skeletal structure which is low density aerogel, while controlled slow evaporation of the liquid phase from the gels leads to a xerogel, which may be high density. Applying stress during the extraction phase can result in high-density materials. By use of the sol-gel processing, energetic materials can be made, for example, by solution powder/particle addition, or solution addition, or and solution exchange.

The method of preparing energetic metal-oxide-based pyrotechnics using sol-gel chemistry involves a metal-oxide skeletal structure prepared from hydrolyzable metals with either powdered metal (or other fuels) added to the sol prior to gelation or grown within the solid matrix after drying.

Metal salt precursor route: With metal salts a proton scavenger, such as of butadiene monoxide, cyclohexene oxide, cis-2,3-epoxybutane, propylene oxide, 1,2-epoxybutane, 1,2-epoxypentane, 2,3 epoxy (propyl) benzene, glycidol, epichlorohydrin, epifluorohydrin, epibromohydrin and trimethylene oxide is used to destabilize the sol and induce gelation. Drying is done by either slow evaporation of the liquid residing within the pores, or by supercritical extraction, depending of the desired density and porosity of the thus produced nanocomposites. Organic constituents for binders or gas generators during reactions burn rate modifiers, or spectral emitters may be added to change physical and chemical properties. Thus, the invention provides radically new metal-oxide material synthesis, and the material has demonstrated both low and high solids loading casting to near-net-shape. By this invention one can make metal-oxide-based energetic materials, e.g., pyrotechnics, with the following general sol-gel reaction schemes for metal precursors:

$M_aX_b + bH_2O \rightarrow M_a(H_2O)_b + bX$ $M_a(H_2O)_b + 2b[\text{proton scavenger}] \rightarrow M_aO_b + 2b[\text{proton scavenger-H}]$ where M is the metal and X is the salt anion (ionic charges not listed).

Metal Alkoxide Precursor Route:

Alternatively, instead of starting with a metal salt precursor, a metal alkoxide may be used. In this case the metal alkoxide is hydrolyzed and then condensed to form a metal-oxide using standard well-known sol-gel chemical methods. Acid or base catalysis is used to induce gelation. The other steps in making an energetic material are the same as those described previously with metal salt precursors. The general sol-gel reaction scheme using metal alkoxide precursors is:

$M_a(OR)_b + bH_2O \rightarrow M_a(OH)_b + bROH$ $M_a(OH)_b \rightarrow M_aO_{1/2b} + 1/2bH_2O$ Where M is the metal, OR is the alkoxide. In the first reaction the metal alkoxide is hydrolyzed. The second step is a condensation reaction where the metal-oxide gel is formed.

Other Solvents May Be Used but Water Must Be Present.

100% $Fe_xO_y$ aerogel and xerogel gels, for example, have been formed in 5–60 minutes. An $Fe_xO_y/Al$ metal-oxide energetic material can be derived from sol-gel chemistry using aluminum as a fuel, which may be grown in situ or added as powder. The general reaction scheme for these energetic nanocomposites is:

$M_aO_b + [\text{Fuel}] \rightarrow aM + [\text{Fuel-O}_b] + \text{energy}$

Where $M_aO_b$ is nanostructured metal-oxide oxidizer. Numerous metal-oxide nanostructured materials have been synthesized by us from the following metal salts or metal alkoxides of: Fe, Cr, Al, Ga, In, Hf, Sn, Zr, Mo, Ti, V, Co, Ni, Cu, Y, Ta, W, Pb, B, Nb, Ge, Pr, U, Ce, Er and Nd. This process can be utilized with metals from the following elements of the periodic table: Groups 2 through 13, part of Group 14 (germanium, tin, lead), part of Group 15 (antimony, bismuth), part of Group 16 (polonium), and the lanthanides and actinides.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

The present invention involves sol-gel manufactured metal-oxide-based energetic materials and a process for manufacturing the energetic material utilizing sol-gel chemistry. The manufacturing process of this invention solves many of the prior problems associated with the prior fabrication of metal-oxide-based energetic materials (explosives, propellants, and pyrotechnics). As pointed out above, energetic materials consist of fuel and oxidizers, which are intimately mixed, but may also contain other constituents such as binders, plasticizers, stabilizers, pigments, etc. The prior problems associated with mixing of the constituents and forming of these materials into desired shapes have been significantly reduced, if not eliminated, by utilizing sol-gel processing in accordance with the present invention.

Sol-gel methodology produces high surface area, porous solids, which may be cast to near-net shape. The microstructure, comprised of nanometer-sized pores and linked primary particles, as well as the elemental composition, can be tailored and controlled by solution chemistry.

The methodologies of sol-gel manufacturing techniques are briefly described as follows:

Powder/Particle Addition: The energetic material fuel and other constituents, in particulate form, are either mixed with the pre-gel solution or added to a pre-made gel, resulting in a composite of metal-oxide oxidizer gel with distributed reactant particles (fuel).

Solution Addition: The energetic material constituent is dissolved in a solvent which is compatible with the reactive metal salt and mixed into the pre-gel solution prior to gelation. Upon gelation, the energetic material constituent is uniformly distributed within the pores of the solid metal-oxide network formed by the polymerization of the reactive metal salt precursor or metal alkoxide precursor.

Solution Exchange: After gelation, the liquid phase is exchanged with another liquid which contains an energetic material constituent, thus allowing deposition of the energetic material constituent within the gel.

The sol-gel manufacturing of energetic materials solves many of the prior above-described problems associated with the manufacture of energetic materials, particularly metal-oxide energetic materials.

Controlling composition at the nanometer scale is well known in altering material properties in sometimes highly desirable and dramatic ways. In the field of energetic materials ingredient distributions, particle size, and morphology, effect both sensitivity and reactivity performance. To date nanostructured energetic materials are largely unknown with the exception of nanometer reactive powders now being produced at a number of laboratories. We have invented a new method of making nanostructured energetic materials, specifically explosives, propellants, and pyrotechnics, using sol-gel chemistry. This can be done using low cost processing. We describe a new synthesis route for making metal-oxide-based pyrotechnics. This process employs the use of stable and inexpensive metal salt or metal alkoxide precursors and environmentally friendly solvents such as water and ethanol. Generically the synthesis is straightforward and first involves the dissolution of the metal salt or the metal alkoxide precursor in a solvent. With the metal salt precursor dissolution is followed by addition of a proton scavenger which induces gel formation in a timely manner. In the case of metal salt precursors experimental evidence shows that there is an irreversible proton scavenger reaction that induces the hydrated-metal species to undergo hydrolysis and condensation to form a sol that undergoes further condensation to form an inorganic metal-oxide nanostructured gel. With metal alkoxide precursors standard well-known sol-gel methods are used. After hydrolysis acid or base catalysis induces condensation into the metal-oxide gel.

Both critical point and atmospheric drying have been employed to give monolithic aerogels and xerogels respectively. Using this method we have synthesized a myriad of metal-oxide nanostructured materials from metal salts (list previously). The materials have been characterized using optical and electron microscopies (SEM and TEM), infrared spectroscopy (FTIR), surface area (BET) and pore and volume analyses, powder x-ray diffraction (PXRD), and mechanistic methods. The ease of this synthetic approach along with the inexpensive and stable nature of the metal salts and solvents allow for potentially large-scale syntheses to be carried out. This method can be extended to many other main periodic chart groups and the transition metals.

The technique allows for the addition of insoluble materials (e.g., fine metals, polymers, etc.) to the viscous sol, just before gelation, to produce a uniformly distributed and energetic nanocomposite upon gelation. As an example, energetic nanocomposites of $Fe_xO_y$ are readily synthesized. The compositions are stable, safe, and can be readily ignited to thermitic reaction. Production and characterization data of these novel energetic materials is described hereinafter.

Figure 1:
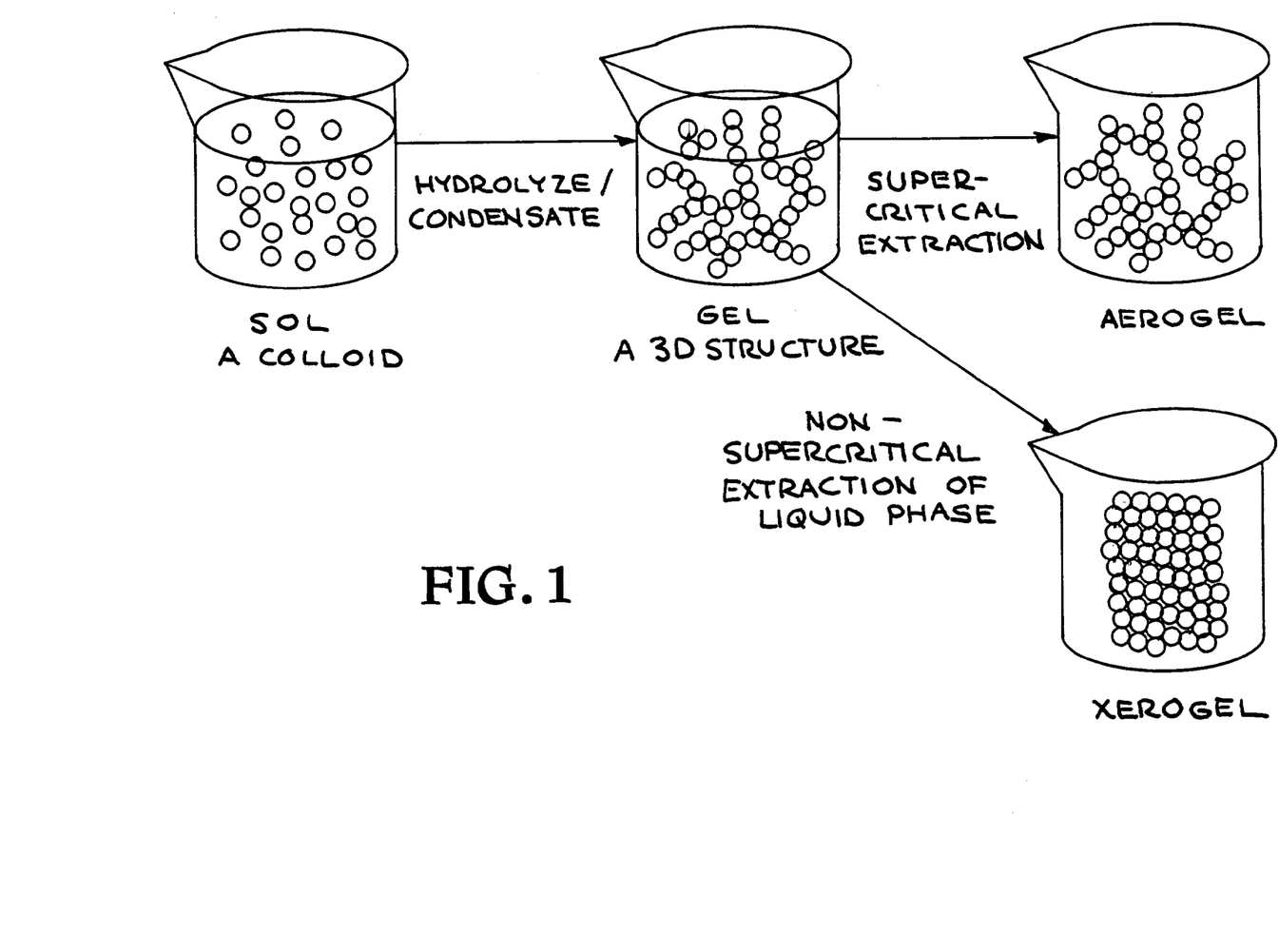
FIG. 1 illustrates the general process for sol-gel synthesis and processing.

The general process for sol-gel synthesis and processing is illustrated in FIG. 1. Monomers are reacted in solution to produce small nanometer size particles, a "sol," which cross-link to form a three-dimensional solid network with the remaining solution residing within open pores, a "gel." Controlled evaporation of the liquid phase in a gel results in a xerogel, while supercritical extraction eliminates the surface tension of the retreating liquid phase, producing highly porous metal-oxide solids. Energetic materials constituents may be held within the micro or mesoscale porosity. Solids may be directly added to the gels, and the type of solvent extraction will be determined by the desired composition of the end product. In general aerogels have a substantially lower density and higher porosity than xerogels.

The methodology of the present invention solves many problems found in existing state-of-the-art energetic materials synthesis and processing. One example is the pressing of powders of energetic material for detonators and related devices. Low manufacturing rates, difficulty in handling fine powders, and the inability to produce precise geometric shapes may be solved by this approach. Another current experimental limitation is producing precise intimate mixtures of fuels and oxidizers. Using sol-gel chemistry, the intimacy of mixing can be controlled and dramatically improved over the current art of mixing granular solids. A solid skeleton composed of the metal-oxide oxidizer with the fuel distributed throughout the nanostructured network.

Perhaps more importantly, however, the sol-gel technology may be able to make energetic materials which have entirely new and desirable properties. A significant observation is that the presence of the gel structure dramatically decreased the sensitivity to impact. This result was counter to that expected. This one technical element could have a dramatic effect in the handling and processing of energetic materials.

Following the sol-gel processing as described above and in the two above referenced applications, metal-oxide-based energetic materials have been developed in accordance with the method of the present invention, and these metal-oxide-based energetic materials are essentially nanostructure pyrotechnic materials. In this material a metal-oxide gel structure reacts rapidly with a distributed fuel exchanging the oxygen and releasing significant amounts of energy. The invention involves methods to make metal-oxide aerogel and xerogel energetic materials. When processed with fuels, e.g., particulate metals, or other fuels nanostructured energetic materials are readily made.

In addition to providing fine nanostructural and compositional control, sol-gel methodology offers other advantages to safety in energetic material processing. For example, ambient temperature gelation and low temperature drying approaches prevent degradation of the energetic molecules, and the water-like viscosity of the sol before gelation, allows easy casting to near-net shapes.

Figure 2A:
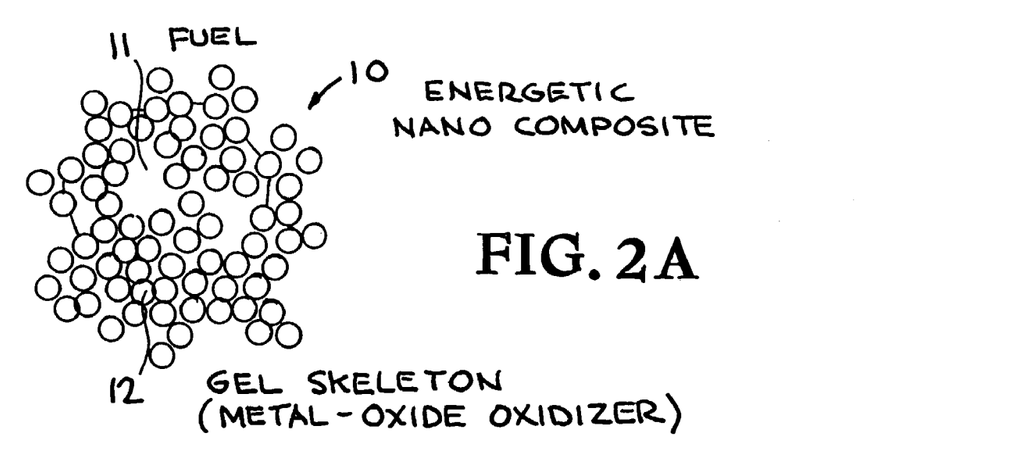
FIGS. 2A–2C illustrates three variants of sol-gel derived energetic materials respectively, comprising energetic nanocomposite structures, energetic nanocrystalline materials, and powder-addition energetic materials.
Figure 2B:
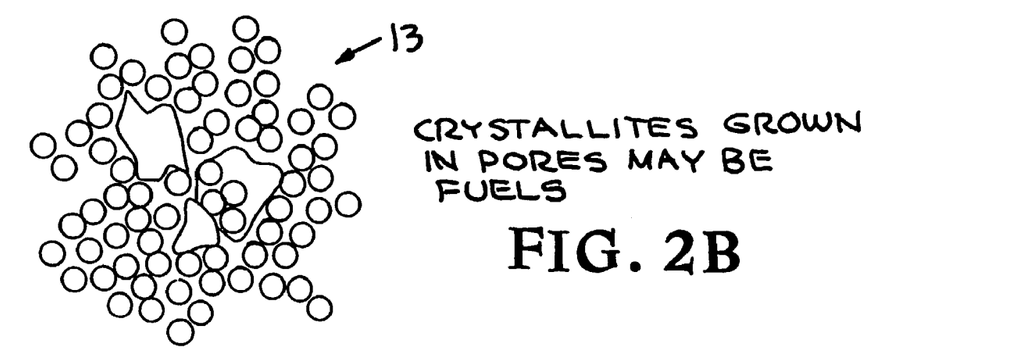
Figure 2C:
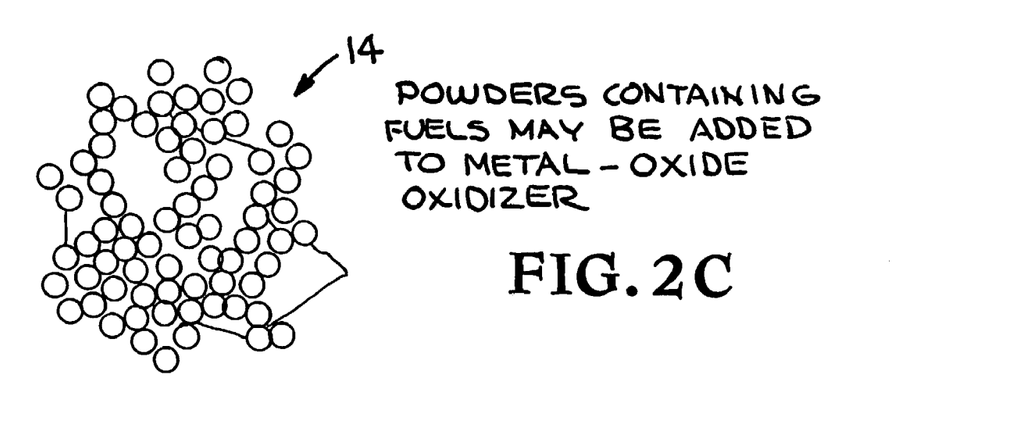
Figure 3:
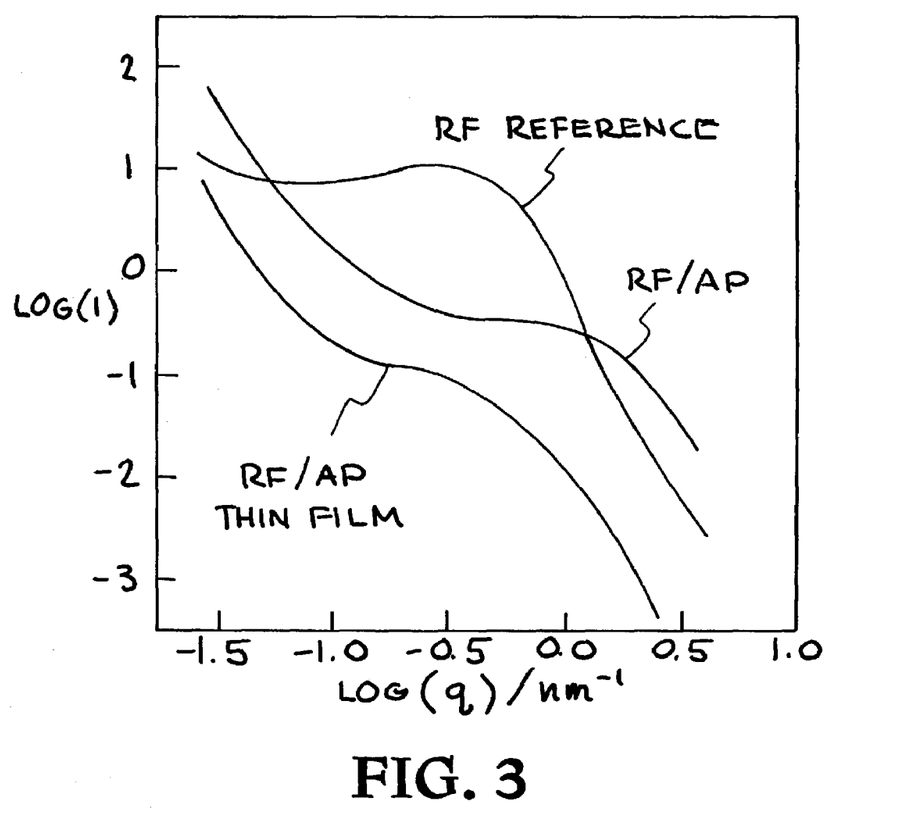
FIG. 3 is a log-log plot of the intensity of scattered neutrons versus the scattering wave vector by SANS, used to characterize the average sizes of scattering particles.

Although sol-gel chemistry is a well-known means of producing nanostructural materials, it has not, prior to the work on the above-referenced patent applications, been proposed as a route to create energetic materials, particularly metal-oxide energetic materials. Three new variants of metal-oxide energetic materials have been derived through sol-gel processing, and these three variants are illustrated in FIGS. 2A, 2B, and 2C. FIG. 2A illustrates a sol-gel energetic nanocomposite indicated at 10, and sections as indicated by legend and arrow 11 is a fuel, and the sections indicated by legend and arrow 12 is the metal-oxide gel oxidizer. FIG. 2B illustrates sol-gel energetic nanocrystalline materials (13) wherein crystallites grown in metal oxide pores may be fuels as indicated by legend. FIG. 2C illustrates sol-gel powder addition energetic materials 14 wherein fuels are added to the metal-oxide prior to complete gelation.

Nanocomposites are multicomponent materials in which at least one of the component phases has one or more dimensions (length, width, or thickness) in the nanometer size range, usually defined as 1 to 100 nm. Energetic nanocomposites are a class of materials that have a fuel component and an oxidizer component intimately mixed on the nanometer scale with at least one of the component phases which meets the above size definition. An example would be an organic skeletal metal-oxide matrix acting as an oxidizer, with a fuel embedded within this network, as shown in FIG. 2A.

We have made nanostructured metal-oxide energetic materials using sol-gel chemistry to synthesize the metal-oxide. This can be done in something as simple as a beaker using low-cost processing. Hence, a myriad of nanostructured energetic materials, in particular pyrotechnics, could be made practically using sol-gel chemistry. This process employs the use of stable and inexpensive hydrated-metal salts or metal alkoxides; in general, environmentally friendly solvents such as water and ethanol. Generically the synthesis is straightforward and involves the dissolution of the hydrolyzable metal precursor in the respective solvent followed by addition of a catalyst (acid or base catalysis) or proton scavenger which induces gel formation in a timely manner. With metal salt precursors experimental evidence shows that there is an irreversible proton scavenger that induces the hydrated-metal species to undergo hydrolysis and condensation to form a sol that undergoes further condensation to form an inorganic metal-oxide nanostructured gel.

Figure 4:
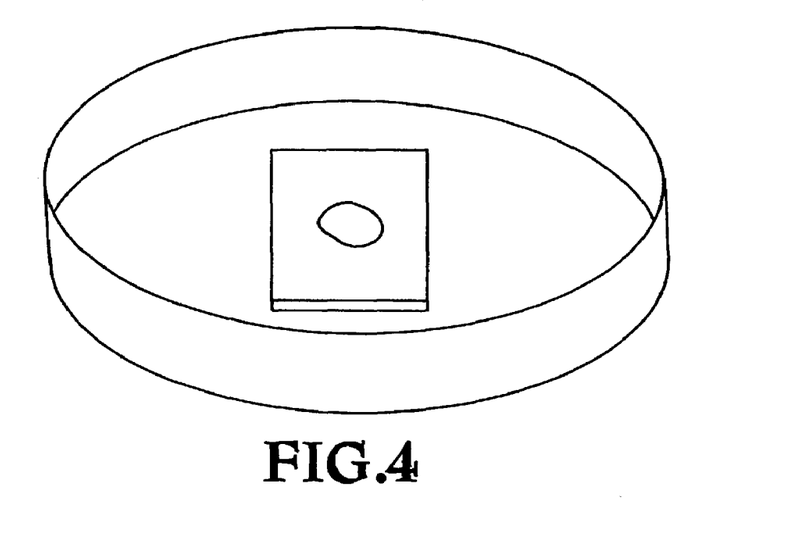
FIG. 4 illustrates $Fe_xO_y$/aluminum metal reacting on a silica aerogel.

The sol-gel metal-oxide technique allows for the addition of insoluble materials, e.g., metal fuels or polymers, to the viscous sol, just before gelation, to produce uniformly distributed and energetic nanocomposites upon gelation. As an example energetic nanocomposites of $Fe_xO_y$ are readily synthesized. The compositions are stable, safe, and can be readily ignited to thermitic reaction. FIG. 4 shows the reaction of a sol-gel derived iron oxide-aluminum xerogel. In conventional pyrotechnics, domains rich in either fuel or oxidizer exist, which limit the mass transport and therefore decrease the efficiency of the burn. Sol-gel nanocomposites can be uniformly mixed as is demonstrated by the RF-AP system discussed above. In sol-gel composite systems, the fuel resides within the solid metal-oxide, oxidizing matrix.

Another energetic material that we synthesized consisted of a mixture of micron size aluminum particles and nanostructured iron-silicate. This system was prepared using a modified two-step, sol-gel procedure that was first developed in the early 1990s for preparing ultralow-density silica aerogels. In the first step, a sub-stoichiometric amount of water was added to tetramethoxysilane (TMOS) and allowed to react. Hydrated iron (III) nitrate was added to the solution at this stage, and a small amount of acid was added to promote some hydrolysis reactions while also slowing the condensation reactions. The molar amount of water used was kept less than 1.6 moles water per mole of TMOS, including the water from the hydrated salt. In the second step, the additional water needed to complete the hydrolysis, and a fluoroboric acid catalyst, were added to the solution. As in the example above, with a pre-determined gel time, powdered aluminum is added just prior to gelation.

Figure 5:
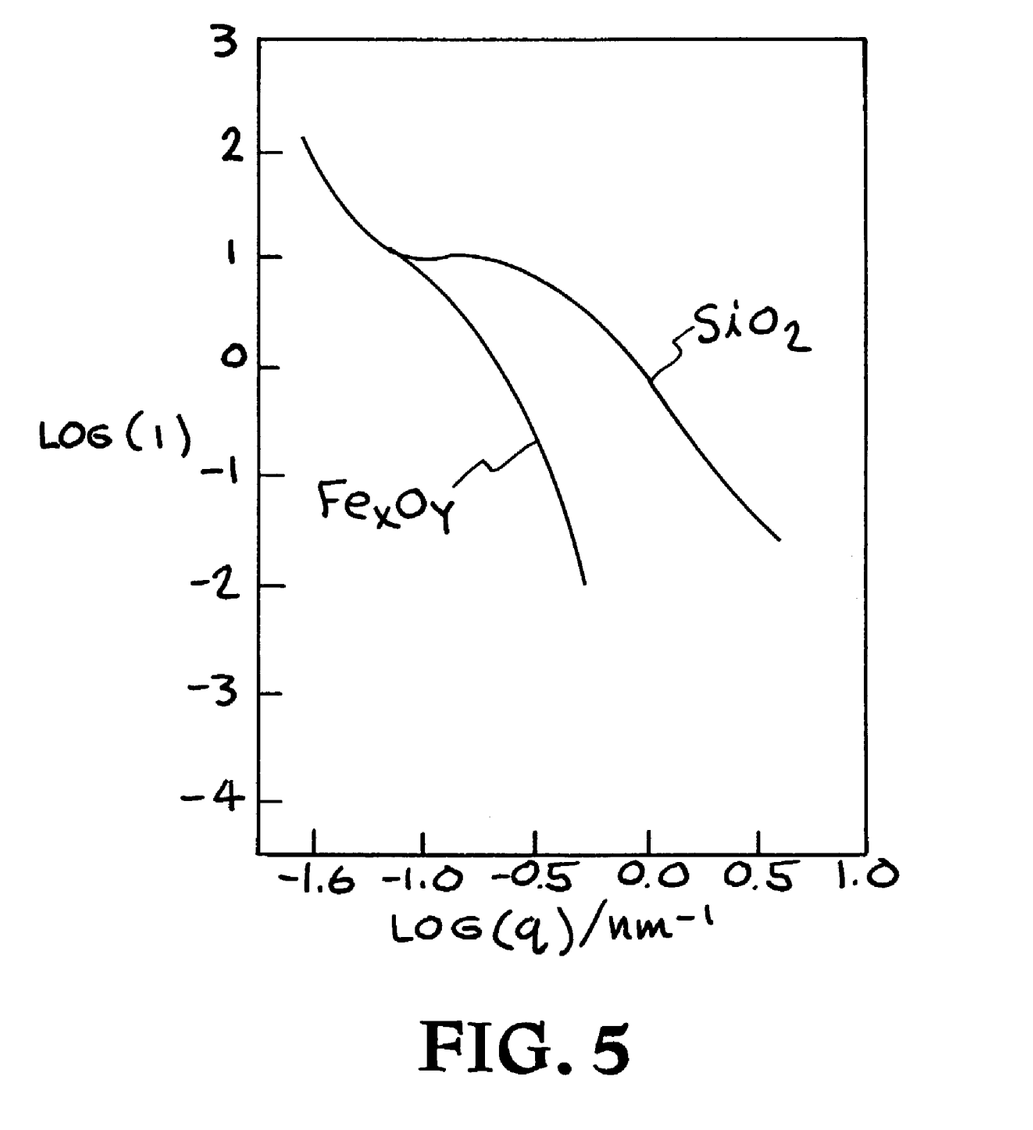
FIG. 5 is a log-log plot of the intensity of scattered neutrons versus the scattering wave-vector for an iron-silicate nanocomposite, using phase contrast techniques, for showing different particle sizes for the two oxides.

A variant of SANS involving a phase-contrast technique, was used to characterize the thermite nanocomposites. Phase-contrast SANS is a non-destructive method for determining how one phase in a nanostructure is dispersed within the other. It has been used extensively in the field of ceramics and has recently been used as a characterization tool for the nanostructure of aerogels. In this method, a mixture of $D_2O/H_2O$ is wicked into the skeleton to match the neutron cross-section for one of the phases, essentially hiding the structure of that phase while elucidating the structure of the other. The results for the iron-silicate sample (without the aluminum) identified an iron-oxide nanostructure that is similar to the typical silicon-oxide structure as shown in FIG. 5. As seen, FIG. 5, a log-log plot of the intensity of scattered neutrons verses the scattering wave-vector for an iron-silicate nanocomposite, and shows different particle sizes for the two oxides, using phase contrast techniques.

The following is a generalized example of the procedure or operational steps for carrying out the method, involving six (6) operations, with the first four (4) operations producing an inorganic gel and with the following two (2) operations producing a metal-oxide energetic nanocomposite, with the elected drying operation (step 6) being carried out for also producing the inorganic gel (steps 1–4 and 6):

1. Weigh solution 1.0 gms $Fe(WO_3)_3 \cdot H_2O$
    5.0 gms EtOH (200° proof)
2. Dissolve with mixing -continued 3. Add 2.0 gms polypropylene (PO)*
4. Stir
5. Add Aluminum just prior to gelation (~5 min. gel time)
   *teflon or gas generators
6. Dry    A) SCE
   B) Xerogel   A) SCE   (both cases)
              B) Xerogel

*concentration of PO determines gel time

Various sol-gel metal-oxide pyrotechnics are being synthesized in accordance with the method of this invention. The sol-gel derived energetic materials have been tested for sensitivity to impact. In the nanostructured energetic materials tested to date in impact sensitivities were found to be significantly less than those observed for analogous conventional materials. For example, a 90 wt % PETN (an explosive)/10% $SiO_2$ xerogel made by the above procedure resulted in a drop hammer $H_{50}$ value of 133 cm compared with the result for neat PETN which has an $H_{50}$ value of 17 cm. These sol-gel material results were initially surprising because conventionally mixed powders generally exhibit increased sensitivity with the addition of oxides. PETN-based compositions previously made by blending with fumed $SiO_2$ were found to have $H_{50}$ values less than 10 cm. The reason for the decrease in impact sensitivity in the sol-gel derived materials is not fully understood. There are several hypotheses. First, the impact test is essentially a frictional ignition and propagation test. Pure aerogels and xerogels have very low thermal transport properties in convection and conduction. This characteristic may impede deflagration. Second, whereas most energetic materials have stress-risers on the order of microns, the sol-gel materials have structures on the nanometer scale; hence, stresses will be more uniformly distributed and large hot spots less likely to be created in impact. What hot spots are made are likely to be smaller. At the initial stage of hot spot generation thermal dissipation may be greater than thermal generation due to the high surface-to-volume ration of the hot spots. Decreased sensitivity is one example of the new and different properties attributed to the nanostructured nature of these energetic materials.

It has thus been shown that the method of the invention enables the preparation of energetic metal-oxide energetic materials using sol-gel chemistry. A metal-oxide oxidizer skeletal structure is prepared from hydrolyzable metal precursors (metal salts or metal alkoxides) with fuel added to the sol prior to gelation or grown within the solid matrix after drying, which can be carried out by either low temperature evaporation or by supercritical extraction whereby the density of the produced nanocomposites is controlled. With metal salts precursors propylene oxide, or other proton scavengers, are used to destabilize the sol and induce gelation. With metal alkoxide precursors standard well-known sol-gel hydrolysis and condensation processing is used. By the method of this invention metal-oxide material synthesis may be carried out using elements of the periodic table: Groups 2 through 13, part of Group 14 (germanium, tin, lead), part of Group 15 (antimony, bismuth), part of Group 16 (polonium), and the lanthanides and actinides.

While particular materials, parameters, sequence of operations, etc. have been described and/or illustrated to exemplify and teach the principles of the invention, such are not intended to be limiting. Modifications and changes may become apparent to those skilled in the art, and it is intended that the invention be limited only by the scope of the appended claims.

What is claimed is:
1. A method comprising:
   dissolving a metal salt or metal alkoxide in a solvent to form a metal salt solution or a metal alkoxide solution;
   adding a proton scavenger to the solution if the solution is a metal salt solution to induce the formation of a gel;
   adding water and a catalyst to the solution, if the solution is a metal alkoxide solution to induce the formation of a gel;
   adding a fuel to the metal salt or metal alkoxide solution;
   allowing a gel to form; and
   drying said gel to produce an energetic nanocomposite.
2. The method recited in claim 1, wherein the fuel is a powdered fuel.
3. The method recited in claim 1, wherein the drying is accomplished by slow evaporation of the liquid.
4. The method recited in claim 1, wherein the drying is accomplished by supercritical extraction.
5. The method recited in claim 1, further comprising adding organic constituents.
6. The method recited in claim 1, wherein the proton scavenger is selected from the group consisting of butadiene monoxide, cyclohexene oxide, cis-2,3-epoybutane, propylene oxide, 1,2-epolybutane, 1,2-epoxypentane, 2,3-epoxy (propyl)benzene, glycidol, epichlorohydrin, epifluorohydrin, epibromohydrin and trimehtylene oxide.
7. The method recited in claim 1, wherein the solvent is selected from the group consisting of water, methanol, ethanol, 1-propanol, t-butanol, dimethylformamide, acetone, ethylene glycol, propylene glycol, and benzyl alcohol.
8. The method recited in claim 1, wherein the metal portion of the metal salt or metal alkoxide is selected from the following elements of the periodic table: Groups 2 through 13, germanium, tin, lead, antimony, bismuth, polonium, the lanthanides and the actinides.

* * * * *